United States Patent
Letey et al.

(10) Patent No.: US 10,587,575 B2
(45) Date of Patent: Mar. 10, 2020

(54) SUBSYSTEM FIREWALLS

(71) Applicant: Microsoft Technology Licensing, LLC, Redmond, WA (US)

(72) Inventors: George Thomas Letey, Louisville, CO (US); Douglas L. Stiles, Livermore, CA (US); Edmund B. Nightingale, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 15/607,311

(22) Filed: May 26, 2017

(65) Prior Publication Data

US 2018/0343234 A1 Nov. 29, 2018

(51) Int. Cl.
| | | |
|---|---|---|
| *H04L 29/06* | (2006.01) | |
| *G06F 21/53* | (2013.01) | |
| *G06F 21/57* | (2013.01) | |
| *G06F 12/14* | (2006.01) | |
| *G06F 13/24* | (2006.01) | |
| *G06F 21/30* | (2013.01) | |
| *G06F 9/50* | (2006.01) | |
| *G06F 15/78* | (2006.01) | |
| *G06F 21/85* | (2013.01) | |

(52) U.S. Cl.
CPC .......... *H04L 63/02* (2013.01); *G06F 12/1441* (2013.01); *G06F 21/53* (2013.01); *G06F 21/575* (2013.01); *H04L 63/14* (2013.01); *G06F 9/5077* (2013.01); *G06F 13/24* (2013.01); *G06F 15/7825* (2013.01); *G06F 21/30* (2013.01); *G06F 21/85* (2013.01); *G06F 2212/1052* (2013.01)

(58) Field of Classification Search
CPC ........................................................ H04L 63/02
USPC ........................................................... 726/11
See application file for complete search history.

(56) References Cited

U.S. PATENT DOCUMENTS 5,630,099 A 5/1997 MacDonald et al.
5,706,407 A 1/1998 Nakamura et al.
(Continued)

FOREIGN PATENT DOCUMENTS

| EP | 1736877 A2 | 12/2006 |
| EP | 2808818 A1 | 12/2014 |
| WO | 2015103374 A1 | 7/2015 |

OTHER PUBLICATIONS

"Non Final Office Action Issued in U.S. Appl. No. 15/607,330", dated Oct. 30, 2018, 14 Pages.
(Continued)

*Primary Examiner* — Longbit Chai
(74) *Attorney, Agent, or Firm* — Davin Chin; Chin IP, PLLC

(57) ABSTRACT

The disclosed technology is generally directed to firewalls. In one example of the technology, a first firewall is used such that communication is blocked from a first subsystem of a device upon boot of the device. The first firewall is enabled to be configured by secure code subsequent to boot such that code that is not secure code is prevented from configuring the first firewall. After configuration of the first firewall, based on the configuration, the first firewall is used to selectively allow the first subsystem access to the first memory based on ranges of addresses of the first memory configured as accessible to the first subsystem.

20 Claims, 5 Drawing Sheets

(56) References Cited

U.S. PATENT DOCUMENTS

| | | | |
|---|---|---|---|
| 5,926,648 A | 7/1999 | Ayzenberg | |
| 6,775,730 B2 | 8/2004 | Marr et al. | |
| 7,315,940 B1 | 1/2008 | Audette et al. | |
| 7,398,390 B2 | 7/2008 | Hyser | |
| 7,467,254 B2 | 12/2008 | Dortu | |
| 7,836,263 B2 | 11/2010 | Fukushige et al. | |
| 8,001,334 B2 | 8/2011 | Lee | |
| 8,051,263 B2 * | 11/2011 | Renno | G06F 12/1441 707/781 |
| 8,135,884 B1 | 3/2012 | Sullam et al. | |
| 8,180,973 B1 | 5/2012 | Armangau et al. | |
| 8,528,102 B2 | 9/2013 | Chen et al. | |
| RE45,097 E | 8/2014 | Iyer et al. | |
| 8,875,276 B2 | 10/2014 | Cullimore et al. | |
| 9,189,439 B2 | 11/2015 | Rachakonda et al. | |
| 9,275,709 B2 | 3/2016 | Yasuda | |
| 9,323,932 B2 | 4/2016 | Kegel | |
| 9,336,168 B2 | 5/2016 | Liu et al. | |
| 9,354,934 B2 | 5/2016 | Accapadi et al. | |
| 9,384,165 B1 | 7/2016 | Bao et al. | |
| 9,405,691 B2 | 8/2016 | Vajapeyam | |
| 9,465,617 B1 | 10/2016 | Warkentin et al. | |
| 9,525,626 B2 | 12/2016 | Khoo et al. | |
| 2002/0032829 A1 | 3/2002 | Dalrymple | |
| 2003/0115394 A1 | 6/2003 | Kulchytskyy et al. | |
| 2008/0092145 A1 | 4/2008 | Sun et al. | |
| 2009/0007121 A1 | 1/2009 | Yamada et al. | |
| 2009/0157936 A1 | 6/2009 | Goss et al. | |
| 2009/0204823 A1 | 8/2009 | Giordano et al. | |
| 2009/0257594 A1 | 10/2009 | Qureshi et al. | |
| 2010/0095089 A1 | 4/2010 | Kwon | |
| 2012/0060039 A1 | 3/2012 | Leclercq | |
| 2014/0089725 A1 | 3/2014 | Ackaret et al. | |
| 2014/0108691 A1 | 4/2014 | Kennedy et al. | |
| 2014/0173265 A1 | 6/2014 | Kegel | |
| 2014/0181351 A1 | 6/2014 | Fatemi et al. | |
| 2014/0298056 A1 | 10/2014 | Seki et al. | |
| 2015/0052409 A1 | 2/2015 | Jones | |
| 2015/0356039 A1 | 12/2015 | Kris | |
| 2016/0232057 A1 | 8/2016 | Star et al. | |
| 2016/0299720 A1 * | 10/2016 | Berntsen | G06F 12/0246 |
| 2016/0328272 A1 | 11/2016 | Ahmed et al. | |
| 2017/0046228 A1 | 2/2017 | Palayur et al. | |
| 2018/0341584 A1 | 11/2018 | Letey et al. | |
| 2018/0341620 A1 | 11/2018 | Letey et al. | |
| 2019/0236007 A1 | 8/2019 | Letey et al. | |
| 2020/0004721 A1 | 1/2020 | Letey et al. | |

OTHER PUBLICATIONS

Non-Final Office Action dated Mar. 28, 2018 in U.S. Appl. No. 15/607,330, 5 pages.

"Non Final Office Action Issued in U.S. Appl. No. 15/607,279", dated Jun. 1, 2018, 17 Pages.

"International Search Report and Written Opinion Issued in PCT Application No. PCT/US18/029670", dated Jul. 5, 2018, 13 Pages.

"International Search Report and Written Opinion Issued in PCT Application No. PCT/US18/029675", dated Jul. 26, 2018, 11 Pages.

"International Search Report and Written Opinion Issued in PCT Application No. PCT/US18/029679", dated Jul. 24, 2018, 15 Pages.

Letey, George Thomas; "Core Mapping"; U.S. Appl. No. 15/607,330, filed May 26, 2017; 32 pages.

Letey, George Thomas; "Flash Recovery Mode"; U.S. Appl. No. 15/607,279, filed May 26, 2017; 34 pages.

"Non Final Office Action Issued in U.S. Appl. No. 16/377,226", dated Oct. 4, 2019, 16 pages.

* cited by examiner

SUBSYSTEM FIREWALLS

BACKGROUND

The Internet of Things ("IoT") generally refers to a system of devices capable of communicating over a network. The devices can include everyday objects such as toasters, coffee machines, thermostat systems, washers, dryers, lamps, automobiles, and the like. The network communications can be used for device automation, data capture, providing alerts, personalization of settings, and numerous other applications.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to configurable firewalls between components of an integrated circuit (IC). In one example of the technology, a first firewall is used such that communication from a first subsystem of a device is blocked upon boot of the device. The first firewall is enabled to be configured by secure code, subsequent to boot, such that protections in the first firewall have the effect that code that is not secure code is prevented from configuring the first firewall. After configuration of the first firewall, based on the configuration, the first firewall is used to selectively allow the first subsystem access to the first memory based on ranges of addresses of the first memory configured as accessible to the first subsystem.

In some examples of the disclosure, a multi-core microprocessor device has at least one memory for the multiple cores of the device, such as a static random access memory (SRAM) and/or a flash memory. In some examples, the device has a Secure World and a Normal World, and security on the device has protections for some areas of the device such that the areas can be accessed by Secure World but not by Normal World. However, some examples also have portions of memory associated with a particular Normal World source that can be accessed by that Normal World source but not by other Normal World sources.

For instance, in some examples, the device has two or more microcontrollers that provide input/output (IO) functions, where these microcontrollers are in Normal World and have a lower level of trust than other cores on the device. In some examples, each of these microcontrollers has a portion of memory on the SRAM and/or the flash memory that should be accessible to one of these microcontrollers but not to the others. Each of these microcontrollers may be included in a subsystem. At each IO subsystem, when the subsystem is attempting an access to the SRAM, a firewall may be used to selectively allow access to a particular range of addresses of the SRAM. In this way, each IO subsystem is allowed access to a particular range of addresses configured allowable for the microcontroller and denied access to addresses outside of the allowed range of addresses for the microcontroller. In some examples, the firewall may provide similar selective access to a particular range of addresses in a flash memory.

The firewall may deny the IO subsystem any access when the device is initially booted, to prevent an attack from accessing the memory until the firewall has been configured. Each time the device is booted, the firewall can be configured. In some examples, secure code, e.g. code from Secure World, can configure the firewall, but other code is prevented from configuring the firewall. In some examples, the IO subsystems are not part of the Secure World, and so the IO subsystems cannot configure their own firewalls; the configuration of the firewalls is external to the IO subsystem. The configuration may include an indication, for the firewall, as to which range of addresses of the SRAM (and/or the flash memory, and/or the peripherals) the IO subsystem has access to. In some examples, after the firewall is configured, a sticky lock bit is set, so that the configuration of the firewall is fixed until the device is rebooted.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
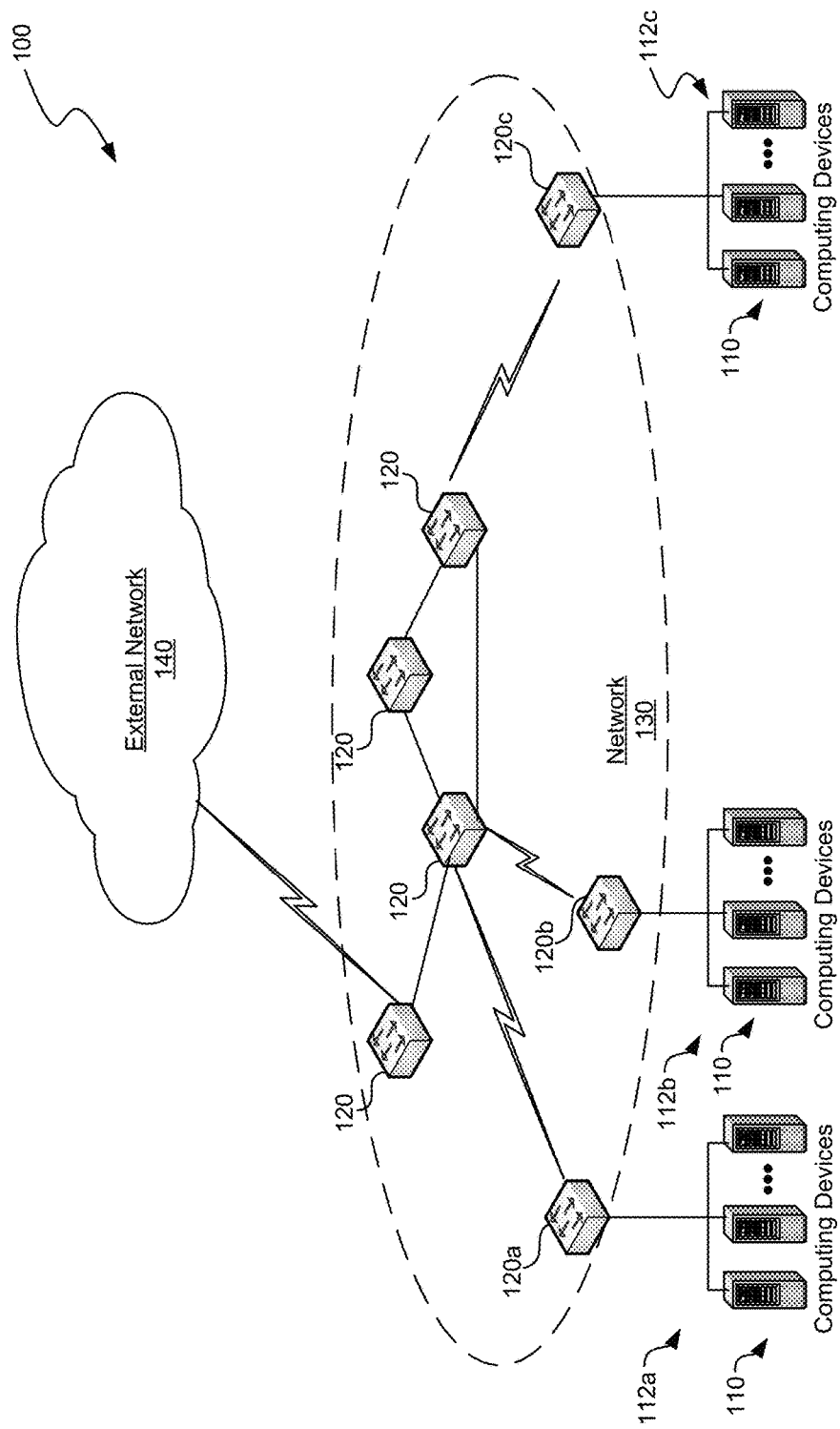
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to configurable firewalls between components of an integrated circuit (IC). In one example of the technology, a first firewall is used such that communication from a first subsystem of a device is blocked upon boot of the device. The first firewall is enabled to be configured by secure code, subsequent to boot, such that protections in the first firewall have the effect that code that is not secure code is prevented from configuring the first firewall. After configuration of the first firewall, based on the configuration, the first firewall is used to selectively allow the first subsystem access to the first memory based on ranges of addresses of the first memory configured as accessible to the first subsystem.

In some examples of the disclosure, a multi-core microprocessor device has at least one memory for the multiple cores of the device, such as a static random access memory (SRAM) and/or a flash memory. In some examples, the device has a secure world (Secure World) and a normal world (Normal World), and security on the device has protections for some areas of the device such that the areas can be accessed by Secure World but not by Normal World. However, some examples also have portions of memory associated with a particular Normal World source that can be accessed by that Normal World source but not by other Normal World sources.

For instance, in some examples, the device has two or more microcontrollers that provide input/output (IO) functions, where these microcontrollers are in Normal World and have a lower level of trust than other cores on the device. In some examples, each of these microcontrollers has a portion of memory on the SRAM and/or the flash memory that should be accessible to one of these microcontrollers but not to the others. Each of these microcontrollers may be included in a subsystem. At each IO subsystem, when the subsystem is attempting an access to the SRAM, a firewall may be used to selectively allow access to a particular range of addresses of the SRAM. In this way, each IO subsystem is allowed access to a particular range of addresses configured allowable for the microcontroller and denied access to addresses outside of the allowed range of addresses for the microcontroller. In some examples, the firewall may provide similar selective access to a particular range of addresses in a flash memory.

The firewall may deny the IO subsystem any access when the device is initially booted, to prevent an attack from accessing the memory until the firewall has been configured. Each time the device is booted, the firewall can be configured. In some examples, secure code, e.g. code from Secure World, can configure the firewall, but other code is prevented from configuring the firewall. In some examples, the IO subsystems are not part of the Secure World, and so the IO subsystems cannot configure their own firewalls; the configuration of the firewalls is external to the IO subsystem. The configuration may include an indication, for the firewall, as to which range of addresses of the SRAM (and/or the flash memory, and/or the peripherals) the IO subsystem has access to. In some examples, after the firewall is configured, a sticky lock bit is set, so that the configuration of the firewall is fixed until the device is rebooted.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is an IoT device, a device that comprises part or all of an IoT support service, a device comprising part or all of an application back-end, or the like, as discussed in greater detail below.

Illustrative Computing Device

Figure 2:
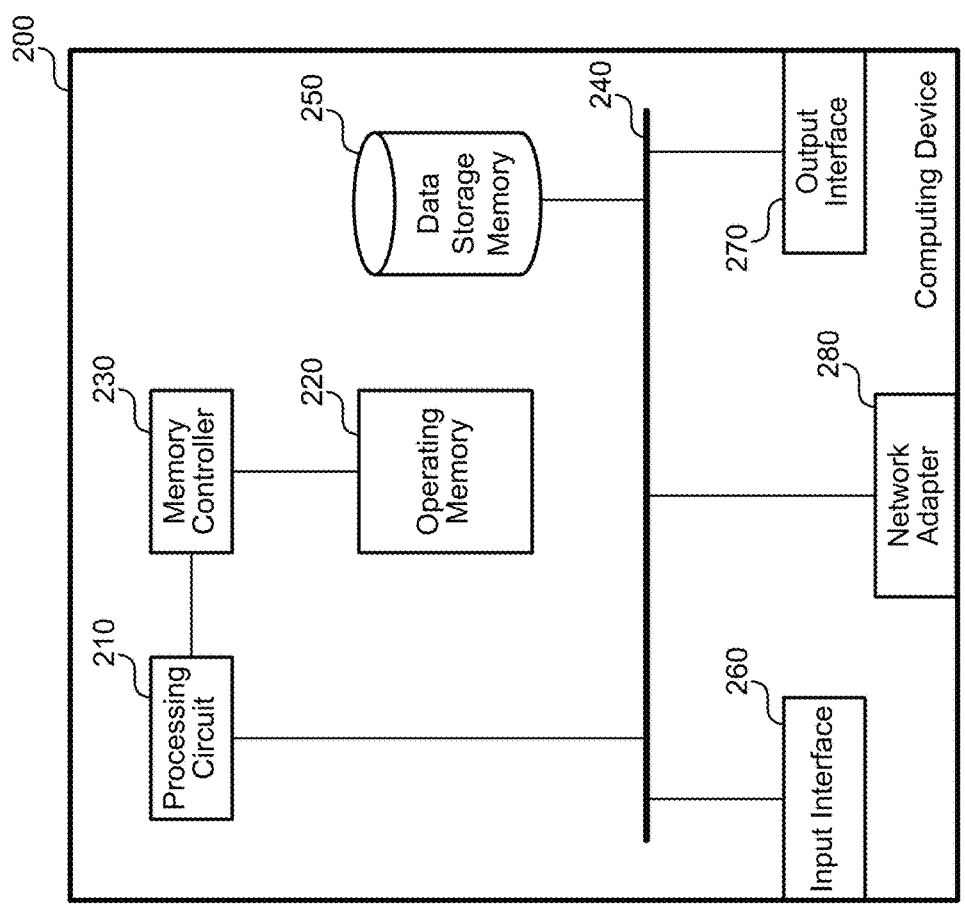
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage component 250, e.g., eXecute In Place (XIP).

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, SigFox, LoRa, Powerline, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions.

Illustrative Systems

Figure 3:
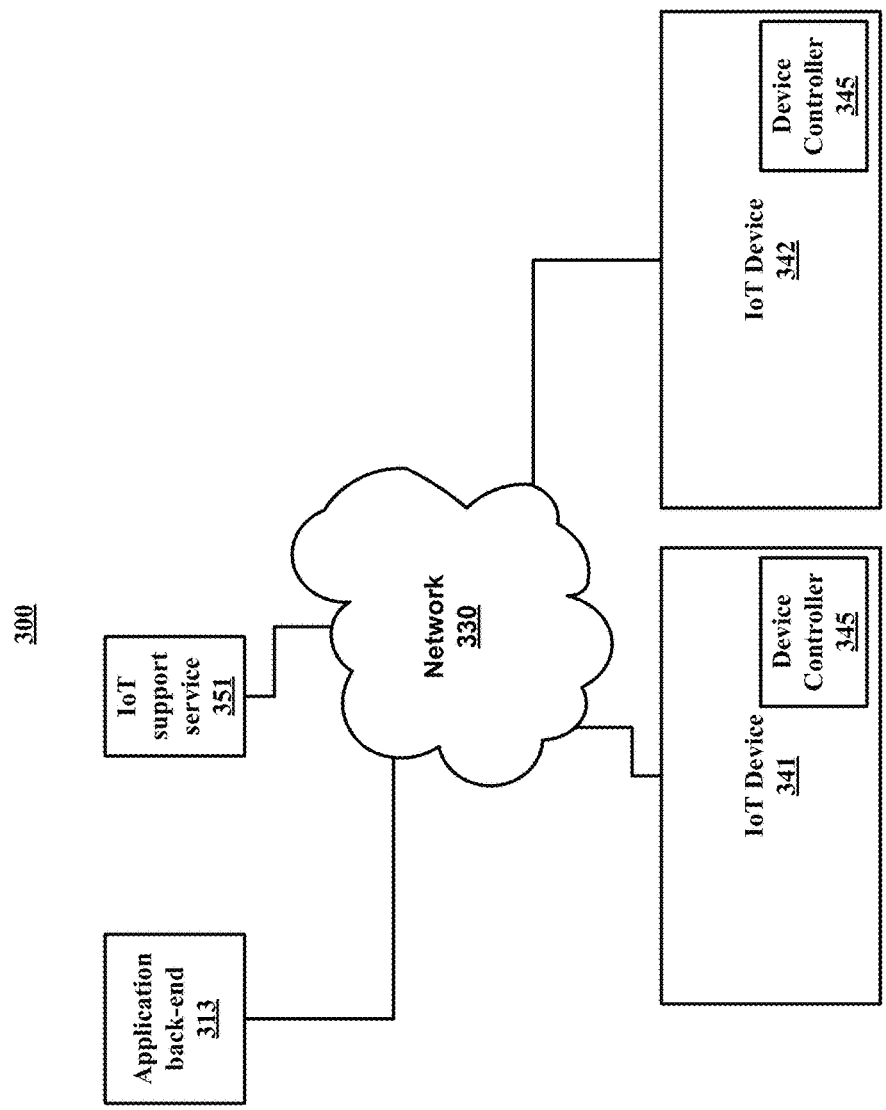
FIG. 3 is a block diagram illustrating an example of a system for device security.

FIG. 3 is a block diagram illustrating an example of a system (300) for device security. System 300 may include network 330, as well as IoT support service 351, IoT devices 341 and 342, and application back-end 313, which all connect to network 330.

The term "IoT device" refers to a device intended to make use of IoT services. An IoT device can include virtually any device that connects to a network to use IoT services, including for telemetry collection or any other purpose. IoT devices include any devices that can connect to a network to make use of IoT services. In various examples, IoT devices may communicate with a cloud, with peers or local system or a combination or peers and local systems and the cloud, or in any other suitable manner. IoT devices can include everyday objects such as toasters, coffee machines, thermostat systems, washers, dryers, lamps, automobiles, and the like. IoT devices may also include, for example, a variety of devices in a "smart" building including lights, temperature sensors, humidity sensors, occupancy sensors, and the like. The IoT services for the IoT devices can be used for device automation, data capture, providing alerts, personalization of settings, and numerous other applications.

The term "IoT support service" refers to a device, a portion of at least one device, or multiple devices such as a distributed system, to which, in some examples, IoT devices connect on the network for IoT services. In some examples, the IoT support service is an IoT hub. In some examples, the IoT hub is excluded, and IoT devices communicate with an application back-end, directly or through one or more intermediaries, without including an IoT hub, and a software component in the application back-end operates as the IoT support service. IoT devices receive IoT services via communication with the IoT support service. In some examples, an IoT support service may be embedded inside of a device, or in local infrastructure.

Application back-end 313 refers to a device, or multiple devices such as a distributed system, that performs actions that enable data collection, storage, and/or actions to be taken based on the IoT data, including user access and control, data analysis, data display, control of data storage, automatic actions taken based on the IoT data, and/or the like. Application back-end 313 could also be one or more virtual machines deployed in a public or a private cloud. In some examples, at least some of the actions taken by the application back-end may be performed by applications running in application back-end 313.

Each of the IoT devices 341 and 342 and/or the devices that comprise IoT support service 351 and/or application back-end 313 may include examples of computing device 200 of FIG. 2. The term "IoT support service" is not limited to one particular type of IoT service, but refers to the device to which the IoT device communicates, after provisioning, for at least one IoT solution or IoT service. That is, the term "IoT support service," as used throughout the specification and the claims, is generic to any IoT solution. The term IoT support service simply refers to the portion of the IoT solution/IoT service to which provisioned IoT devices communicate. In some examples, communication between IoT devices and one or more application back-ends occur with an IoT support service as an intermediary. FIG. 3 and the corresponding description of FIG. 3 in the specification illustrates an example system for illustrative purposes that does not limit the scope of the disclosure.

One or more of the IoT devices 341 and 342 may include device controller 345, which may operate to control the IoT device. Each device controller 345 may include multiple execution environments. Device controller 345 may be a multi-core microcontroller. In some examples, device controller 345 is an integrated circuit with multiple cores, such as at least one central processing unit (CPU) and at least one microcontroller (MCU).

Network 330 may include one or more computer networks, including wired and/or wireless networks, where each network maybe, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. Some IoT devices may be connected to a user device via a different network in network 330 than other IoT devices. In essence, network 330 includes any communication method by which information may travel between IoT support service 351, IoT devices 341 and 342, and application back-end 313. Although each device or service is shown connected as connected to network 330, that does not mean that each device communicates with each other device shown. In some examples, some devices/services shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

As one example, IoT devices 341 and 342 are devices that are intended to make use of IoT services provided by IoT support service 351.

System 300 may include more or less devices than illustrated in FIG. 3, which is shown by way of example only.

Illustrative Device

Figure 4:
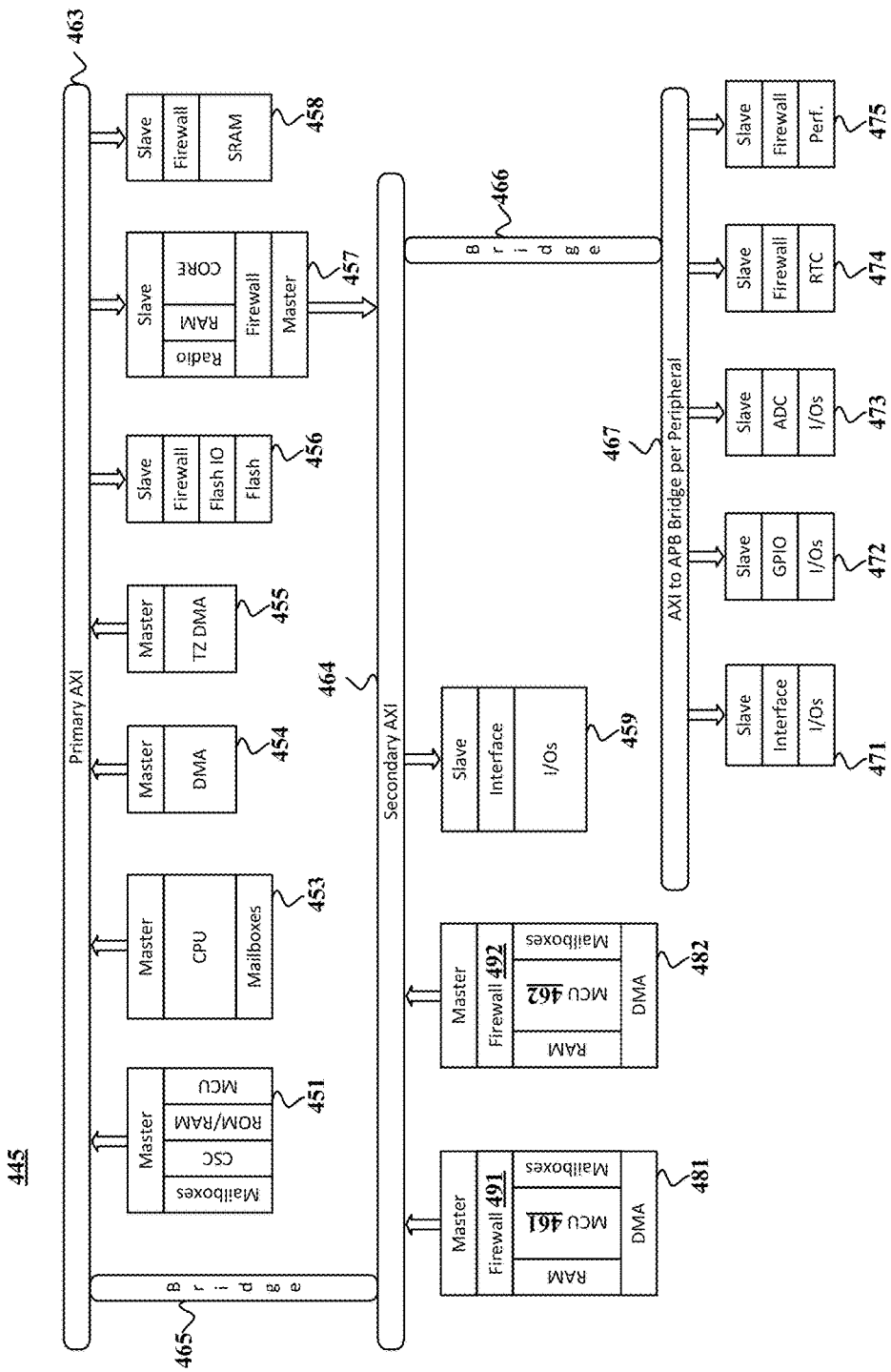
FIG. 4 is a block diagram illustrating an example of a device for device security.

FIG. 4 is a block diagram illustrating an example of device controller 445. Device controller 445 may be employed as an example of device controller 345 of FIG. 3. Device controller 445 may include security complex 451, CPU 453, direct memory access (DMA) block 454, trust zone (TZ) DMA block 455, Flash memory 456, Radio block 457, secure static random access memory (SRAM) 458, Input/Output (IO) Subsystem 481, IO Subsystem 482, primary advanced extensible interface (AXI) bus 463, secondary AXI bus 464, bridges 465 and 466, AXI to advanced peripheral bus (APB) bridges per peripheral 467, Interfaces 471, general purpose IOs (GPIOs) 472, analog-to-digital converter (ADC) 473, real-time clock (RTC) 474, and performance counter 475. IO subsystem 481 may include MCU 461, and IO subsystem 482 may include MCU 462. In some examples, many of the components have firewalls, as illustrated in FIG. 4. In particular, in some examples, IO subsystem 481 has firewall 491, and IO subsystem 482 has firewall 492.

FIG. 4 illustrates but one non-limiting example of device controller 445 and one particular layout of the AXI, AHB, and APB for exemplary purposes. Other suitable layouts and examples of device controller 445 may also be employed.

In some examples, device controller 445 enables a device in which device controller 445 is included to operate as an IoT device, such as IoT device 341 or 342 of FIG. 3. In some examples, device controller 445 is a multi-core microcontroller. In some examples, device controller 445 runs a high-level operating system. In some examples, device controller 445 may have at least 4 MB of RAM and at least 4 MB of flash memory, and may be a single integrated circuit. In some examples, device controller 445 provides not just network connectivity, but various other functions including hardware and software security, a monitored operating system, cryptographic functions, peripheral control, telemetry, and/or the like. In addition, device controller 445 may include technology for allowing device controller 445 to be booted in a secure manner, allowing device controller 445 to be securely updated, ensuring that proper software is running on device controller 445, allowing device controller 445 to function correctly as an IoT device, and/or the like.

In some examples, security complex 451 includes a core security complex (CSC) that is the hardware root of trust in device controller 445. In some examples, the core security complex is directly connected to the secure MCU in security complex 451. In some examples, the secure MCU in security complex 451 has a very high degree of trust, but is less trusted than the core security complex in security complex 451. In some examples, security complex 451 brings up the full system at boot.

In some examples, CPU 453 runs a high-level operating system. In some examples, CPU 453 has two independent execution environments: a secure world (Secure World) execution environment and a normal world (Normal World) execution environment. The term "secure world" is used broadly to refer to a trusted environment and is not limited to a particular security feature. In some examples, the Secure World execution environment of CPU 453 is also part of the trusted computing base of the system. For instance, in some examples, the Secure World execution environment of CPU 453 has unfettered access to reprogram hardware protection mechanisms, such as firewalls in some examples. In some examples, the Secure World execution environment of CPU 453 does not, however, have access to the internals of the core security complex of security complex 451 and relies on the secure MCU of security complex 451 for particular security-sensitive operations. In some examples, the Secure World of CPU 453 and security complex 451 are the Secure World of device 445 which executes secure code, and the rest of device controller 445 is the Normal World of device 445 which does not execute secure code.

Radio block 457 may provide Wi-Fi communication. Primary AXI bus 463 and secondary bus AXI 464 may be buses that connect the components shown. In some examples, bridges 465, 466, and 467 bridge the components shown. RTC block 474 may operate as a real-time clock. In some examples, all components in device controller 345 can read from the RTC block 474, but not all components have write access to RTC block 474. Device controller 445 may include various forms of memory, including flash and SRAM, such as flash memory 456 and secure SRAM 458.

In some examples, IO subsystem 481 and IO subsystem 482 are I/O subsystems for general purpose I/O connectivity. In some examples, IO subsystem 481 and IO subsystem 482 each include an MCU—MCU 461 and MCU 462 respectively in the example illustrated in FIG. 4.

DMA block 454 may be used to manage data movement for the Normal World execution environment of CPU 453. Trust zone (TZ) DMA block 455 may be used to manage data movement for the Secure World execution environment of CPU 453. In some examples, each IO subsystem also has its own DMA block/engine. Each of the DMA blocks/engines may be configured to support data movement between cores, peripherals, other components, and/or the like.

Each of the cores may have bi-directional mailboxes to support inter-processor communication. Performance counter 475 may be configured to count read requests, write requests, and data type requests for performance monitoring. In some examples, performance counter 475 may also be configured to measure latency from a core to a target, such as from MCU 462 to SRAM 458.

In some examples, the interfaces at block 459 include two Inter-integrated circuit Sound (I2S) interfaces: one for audio input and one for audio output. In other examples, other configurations of interfaces may be employed, and block 459 may include any suitable interfaces in various examples.

In some examples, as explained in greater detail below, the independent execution environments of device controller 445—which may include, for example, each core in device controller 445, and in some cases multiple independent execution environments within one core (e.g., the Secure World operating environment in CPU 453 and the Normal World operating environment in CPU 453)—may operate within a hierarchy of trust. In some examples, the hierarchy of trust may play a role in which peripherals are assigned to particular cores. However, the disclosure is not so limited, and in other examples, there is no hierarchy of trust in device controller 445 and the determinations as to which peripherals are assigned to particular cores are based on other factors.

In some examples, the MCU in security complex 451 has a very high degree of trust, but is less trusted than the core security complex in security complex 451. In these examples, the MCU in security complex 451 controls one or more functions associated with a very high degree of trust. In one example, the MCU in security complex 451 controls power for device controller 445 and/or an IoT device.

In some examples, the Secure World execution environment of CPU 453 is also part of the trusted computing base of the system. For instance, in some examples, the Secure World runtime of CPU 453 (Secure World RT) has unfettered access to reprogram hardware protection mechanisms, such as firewalls in some examples. In some examples, Secure World RT does not, however, have access to the internals of the core security complex of security complex 451 and relies on the MCU in security complex 451 for particular security-sensitive operations.

The Normal World execution environment of CPU 453 may be configured to have limited access to such on-chip resources such as memories. In some examples, various security and quality standards (e.g., relatively high standards) may be enforced for code running in this environment but is less trusted than either the code running on the MCU in security complex 451 or the code running in the Secure World of CPU 453.

In some examples, MCUs 461 and 462 are less trusted than the MCU in security complex 451 and less trusted than CPU 453. In some examples, Radio block 457 may include a core, which may be an MCU in some examples. Radio block 457 may provide Wi-Fi functionality and connectivity to the Internet and cloud services such as IoT services. In some examples, Radio block 457 may provide communications via Bluetooth, Near Field Communication (NFC), ZigBee, Long-Term Evolution (LTE), and/or other connectivity technology. In some examples, the core in Radio block 457 does not have any access to unencrypted secrets, and is not capable of compromising the execution of CPU 453. In some examples, Radio block 457 is a slave to CPU 453. In general, FIG. 4 illustrates which components operate as slaves and which components operate as masters.

In some examples, each independent execution environment is managed by a single software component executing in a separate execution environment that is referred to as the "parent" of the execution environment. In such examples, one exception may be that the hardware root of trust (the core security complex of security complex 451 in this example) has no parent. In one particular example, each parent executes in an environment that is at least as trusted as the environments it manages. In other examples, other suitable means of security may be employed. Management operations may include booting and resuming the target environment, monitoring and handling resets in the target environment, and configuring access policy for the target environment. In some cases, certain management operations are performed by a component other than a parent. For instance, in some examples, CPU Normal World is the environment that manages MCUs 461 and 462, but receives assistance from the Secure World of CPU 453 to do so.

For instance, in some examples, the MCU of security complex 451 manages Secure World RT of CPU 453, a component in Secure World RT in CPU 453 manages Normal World OS of CPU 453, a component in the Normal World OS of CPU 453 manages Normal World user-mode of CPU 453, and Normal World user-mode services of CPU 453 manages the MCUs 461 and 462 and the core in Radio block 457.

In some examples, not only are independent execution environments managed by a software component from a more trusted execution environment, but different functions are assigned to the different independent execution environments, with more sensitive functions assigned to more trusted independent execution environments. In one particular example, independent execution environments less trusted than the independent execution environment to which it is assigned are restricted from having access to the function. In this way, in some examples, the independent execution environments achieve defense-in-depth based on a hierarchy of trust.

For instance, in some examples, the core security complex of security complex 451 is at the top of the hierarchy and is assigned to secrets (e.g., encryption keys), the secure MCU in core security complex 451 is next in the hierarchy and is assigned to controlling power, Secure World RT of CPU 453 is next in the hierarchy and is assigned to storage and to write access to a real time clock (RTC), Normal World OS of CPU 453 is next in the hierarchy and is assigned to Wi-Fi, Normal World user-mode applications of CPU 453 is next in the hierarchy and is assigned to applications, and the MCUs 461 and 462 are at the bottom of the hierarchy and are assigned to peripherals. In other examples, functions are assigned to independent execution environments in a different manner.

In some examples, each level of the hierarchy of trust, except for the bottom (i.e., least trusted) level of the hierarchy, has control over accepting or rejecting requests from a less trusted level, e.g., in terms of implementing support for the software they handle, and have the ability to rate limit or audit the requests from less trusted levels, and to validate requests from lower levels, e.g., to ensure that the requests correct and true. Also, as previously discussed, in some examples, each level of hierarchy except the top (i.e., most trusted) level has a parent that is responsible for managing the lower (i.e., less trusted) level, including monitoring whether the software on the lower level is running correctly.

In the example given above, MCUs 461 and 462 are assigned to peripherals. In these examples, MCUs 461 and 462 may be referred to as IO MCUs.

In some examples, each of the cores on device controller 445, such as the MCU in security complex 451, CPU 453, MCU 461, and MCU 462 have a RAM for active memory, as well as one or more memories that may retain information at least until device 445 is powered off or rebooted. In some examples, the cores share SRAM 458 and flash memory 456 as memories that may maintain information at least until device 445 is powered off or rebooted, but not all cores have access to the entirety of SRAM 458 and flash memory 456. In some examples, firewall 491 prevents improper access by IO subsystem 481, including improper access to SRAM 458 and flash memory 456. Similarly, in some examples, firewall 492 prevents improper access by IO subsystem 482, including improper access to SRAM 458 and flash memory 456.

First, in some examples, during normal operations, for certain secure regions of SRAM 458, the slave firewall on SRAM 458 allows access to the secure regions to Secure World, but prevents access to the secure regions by Normal World. Similarly, in some examples, for certain secure regions of flash memory 456, the slave firewall of flash memory 456 allows access to the secure region to Secure World, but prevents access to the secure region by Normal World.

However, in some examples, firewalls 491 and 492 do not determine access to particular regions based only on whether the source attempting access is Secure World or not. For example, SRAM 458 may also have portions of memory associated with a particular Normal World source, IO subsystem 1, that, based on the configuration of firewalls 491 and 492, can be accessed by that IO subsystem 1 but not by IO subsystem 2. Similarly, flash memory 456 may also have portions of memory associated with a particular Normal World source, IO subsystem 481, that, based on the configuration of firewalls 491 and 492, can be accessed by that IO subsystem 1 but not by IO subsystem 2.

For instance, in some examples, IO MCU 461 and IO MCU 462 each have a portion of memory on SRAM 458 and each have a portion of memory on flash memory 456. In some examples, the portion of SRAM 458 for IO MCU 461 should be accessible to IO MCU 461 but not to IO MCU 462. Similarly, in some examples, via firewall 492, the portion of flash memory 456 for IO MCU 462 should be accessible to IO MCU 462 but not to IO MCU 461.

As discussed in greater detail below, firewall 491 may also selectively block particular types of access to a particular region, such as read access, write access, and/or execute access.

During normal operations, in some examples, IO subsystem 481 and IO subsystem 482 are each prevented from improper communications by a memory protection unit (MPU). However, in some examples, the MPUs are software running in Normal World and are not trusted, and it is possible for malicious code stop the MPU from preventing improper communications.

In some examples, firewall 491 is a master hardware firewall that is prevented from being configured by code that is not secure code, where firewall 491 prevents improper communication from IO subsystem 481. In some examples, the term "master firewall" refers to the fact that, for example, IO subsystem 481 is a master while peripherals, SRAM 458, and flash memory 456 are slaves. In some examples, firewalls at a peripheral, at SRAM 458, and at flash memory 456 are slave firewalls, whereas the firewall at IO subsystem 481 is a master firewall.

Similarly, in some examples, firewall 492 is a master hardware firewall that is prevented from being configured by code that is not secure code, where firewall 492 prevents improper communication from IO subsystem 481. In some examples, during normal operation, firewall 491 allows IO subsystem 481 access to some portions of SRAM 458, to some portions of flash memory 456, and to some peripherals, but prevents any other communication from leaving IO subsystem 481. Similarly, in some examples, during normal operation, firewall 492 allows IO subsystem 482 access to some portions of SRAM 458, to some portions of flash memory 456, and to some peripherals, but prevents any other communication from leaving IO subsystem 482.

In some examples, firewall 491 is a master hardware firewall that effectively gives IO subsystem 481 hardware isolation from the rest of device controller 445, and communication not specifically allowed by hardware firewall 491 is prevented from leaving IO subsystem 481, and code that is not secure code from a source external to IO subsystem 481 is prevented from configuring firewall 491. In some examples, firewall 492 may provide similar hardware isolation to IO subsystem 482.

In some examples, during normal operation, for a request for access to SRAM 458 from IO subsystem 481, firewall 491 selectively allows IO subsystem 481 access to a particular window of SRAM 458 that is configured allowable in firewall 491 and where this window of SRAM 458 acts as the portion of SRAM 458 that is memory for MCU 461. In some examples, the window of SRAM 458 that is configured allowable in firewall 491 is a particular range of addresses in SRAM 458. Similarly, in some examples, during normal operation, for a request for access to SRAM 458 from IO subsystem 482, firewall 492 selectively allows IO subsystem 482 access to a particular range of addresses configured allowable in firewall 492 and where this particular range of addresses acts as the portion of SRAM 456 that is memory for MCU 462. In some examples, the range of addresses of SRAM 456 configured allowable in firewall 492 for IO subsystem 482 is separate and non-overlapping with the range of addresses of SRAM 456 configured allowable in firewall 491 for IO subsystem 481. In some examples, at least a portion of the range of addresses of SRAM 456 configured allowable in firewall 492 for IO subsystem 482 is at least partially non-overlapping with the range of addresses of SRAM 456 configured allowable in firewall 491 for IO subsystem 481.

Similarly, in some examples, during normal operation, for a request for access to flash memory 456 from IO subsystem 481, firewall 491 selectively allows IO subsystem 481 access to a particular range of addresses configured allowable in firewall 491 and where this particular range of addresses acts as the portion of flash memory 456 that is memory for MCU 461. Similarly, in some examples, during normal operation, for a request for access to SRAM 458 from IO subsystem 482, firewall 492 selectively allows IO subsystem 482 access to a particular range of addresses configured allowable in firewall 492 and where this particular range of addresses acts as the portion of flash memory 458 that is memory for MCU 462.

In some examples, firewalls 491 and 492 are dynamically configurable hardware firewalls. In some examples, firewalls 491 and firewall 492 are configurable and can be configured again each time device controller 445 is booted. In some examples, upon boot of device controller 445, firewall 491 denies all communication to and from IO subsystem 481 until firewall 491 is properly configured, and firewall 492 denies all communication to and from IO subsystem 482 until firewall 492 is properly configured. In some examples, firewalls 491 and 492 can be configured by secure code, and are prevented from being configured by code that is not secure code.

The configuration of firewall 491 may include, for examples, configurations as to which range of addresses the IO subsystem 481 has access to for requests for access to SRAM 458 and/or flash memory 456, as well as configurations as to which peripherals IO subsystem 481 has access to. Similarly, the configuration of firewall 492 may include, for examples, configurations as to which range of addresses the IO subsystem 482 has access to for requests for access to SRAM 458 and/or flash memory 456, as well as configurations as to which peripherals IO subsystem 482 has access to.

Firewalls 491 and 492 may each include a sticky lock bit. For firewall 491 and firewall 492, the sticky lock bit may be set, so the configuration for the firewall is fixed until device controller 445 is rebooted. "Sticky" bit as used herein means a bit that has two values, and once the bit is set, it is prevented from being changed until the device 445 reboots. For firewall 491 and firewall 492, the firewall may be configured such the firewall is prevented from being changed while the sticky lock bit is set. That is, in some examples, once the sticky lock bit is set, further writes to the firewall have may be ignored or otherwise ineffective. In some examples, firewall 491 is dynamically reconfigurable until its sticky lock bit is set, and firewall 492 is dynamically reconfigurable until its sticky lock bit is set.

During normal operation, after firewalls have been configured and the sticky lock bits have been set, the firewalls may then be used as configured. After configuration, in some examples, when access to SRAM 458 is requested by IO subsystem 481, firewall 491 selectively grants access. In some examples, firewall 491 determines the address range configured for access to SRAM 458 by IO subsystem 481, and determines whether to grant access based on whether the address of the request is included in the address range. In some examples, if so, the request is granted, and if not, the request is denied.

Similarly, in some examples after configuration, when access to flash memory 456 is requested by IO subsystem 481, firewall 491 selectively grants access. In some examples, firewall 491 determines the address range configured for access to flash memory 456 by IO subsystem 481, and determines whether to grants access based on whether address of the request is included in the address range. In some examples, if so, the request is granted, and if not, the request is denied.

Similarly, after configuration, in some examples, when communication with a peripheral is requested by IO subsystem 481, firewall 491 selectively grants access. In some examples, firewall 491 determines which peripherals IO subsystem 481 has access to based on the configuration, and determines whether the peripheral that IO subsystem 481 is requesting to communicate with is one of the peripherals allowed for IO subsystem 481 according to the configuration. In some examples, if so, the request is granted, and if not, the request is denied.

Similarly, after configuration, in some examples, when access to SRAM 458 is requested by IO subsystem 482, firewall 492 selectively grants access. In some examples, firewall 492 determines the address range configured for access to SRAM 458 by IO subsystem 482, and determinates whether to grants access based on whether the address of the request is included in the address range. In some examples, if so, the request is granted, and if not, the request is denied.

Similarly, after configuration, in some examples, when access to flash memory 456 is requested by IO subsystem 482, firewall 492 selectively grants access. In some examples, firewall 491 determines the address range configured for access to flash memory 456 by IO subsystem 482, and determinates whether to grants access based on whether the address of the request is included in the address range. In some examples, if so, the request is granted, and if not, the request is denied.

Similarly, after configuration, in some examples, when communication with a peripheral is requested by IO subsystem 482, firewall 492 selectively grants access. In some examples, firewall 492 determines which peripherals that IO subsystem 481 has access to based on the configuration, and determines whether the peripheral that IO subsystem 481 is requesting to communicate with is one of the peripherals allowed for IO subsystem 481 according to the configuration. In some examples, if so, the request is granted, and if not, the request is denied.

Configurations for firewalls 491 and 492 may also include type of access. For example, firewall 491 may filter types of access requests from IO subsystem 481 versus address range, as previously discussed, but also may configure particular certain types of access for certain address ranges. For example, firewall 491 may prevent all execution, or execution to particular addresses. As another example, firewall 491 may universally prevent, or prevent to particular addresses, code fetches, but for certain address ranges data reads and data writes may be allowed, while not allowing IO subsystem 481 a code fetch from those addresses. Firewall 492 may be configured in a similar way with regard to IO subsystem 481 in some examples.

Firewalls 491 may be configurable in the specific manners discussed above. In some examples, configurations of firewalls 491 and 492 that configures various access, such as access to particular ranges of memories and/or particular peripherals, do not persist upon device reboot. Rather, in these examples, when the device is rebooted, the firewalls 491 and 492 blocks all access, regardless of previous configuration of the firewall, and to not allow access again until configured again subsequent to boot.

Although particular subsystems are discussed herein in conjunction the particular subsystem firewalls, the disclosure is not so limited, and other suitable subsystems may be employed with corresponding master subsystem firewalls for the subsystems. For instance, while IO subsystems have been discussed within, in other examples, the subsystems are not IO subsystems.

In some examples, sticky lock bits are not used, and the firewalls are instead dynamic and reconfigurable throughout operation. For instance, in some examples, SRAM 458 may use buffers and then release the buffers, so that the range of addresses that should be available to a subsystem may dynamically change over time. In these examples, secure code may be able to reconfigure subsystem firewalls such as firewall 491 and 492 over time to reflect the range of addresses that now reflect the memory available to IO subsystem 481 and IO subsystem 482, respectively.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 5:
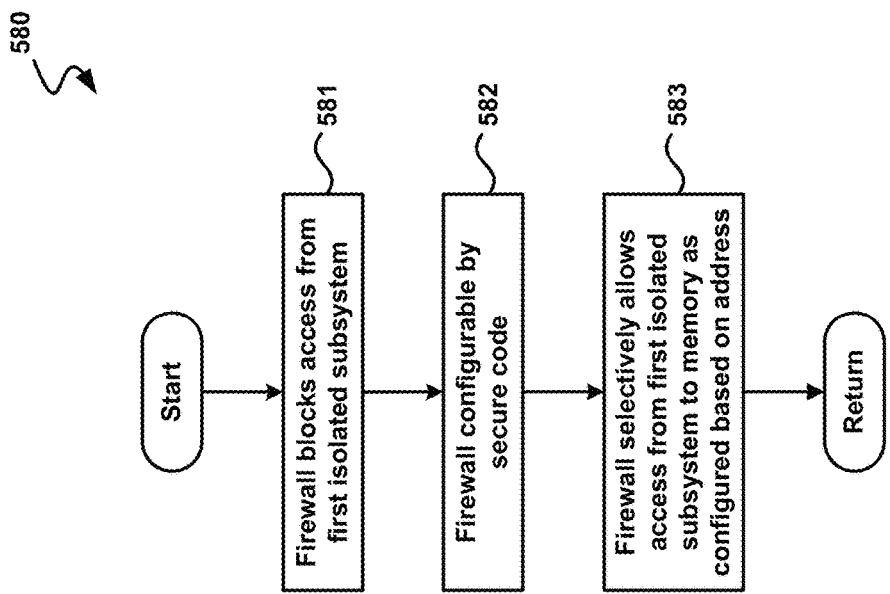
FIG. 5 is a diagram illustrating an example dataflow for a process for device security, in accordance with aspects of the present disclosure.

FIG. 5 is a diagram illustrating an example dataflow for a process (580) for configuring and using firewalls in ICs. In some examples, process 580 may be performed by a master subsystem firewall such as firewall 491 and/or firewall 492 of FIG. 4.

In the illustrated example, step 581 occurs first. At step 581, in some examples, a first firewall is used such that access from a first subsystem is blocked upon boot of the device. As shown, step 582 occurs next in some examples. At step 582, the first firewall is enabled to be configured by secure code subsequent to boot such that code that is not secure code is prevented from configuring the first firewall.

As shown, step 583 occurs next in some examples. At step 583, after configuration of the first firewall, upon the first subsystem attempting to access the first memory, based on the configuration, the first firewall is used to selectively allow the first subsystem access to the first memory based on ranges of addresses of the first memory configured as accessible to the first subsystem.

The process may then proceed to the return block, where other processing may be resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
   a device, including:
   a first memory;
   a first bus master that is configured to operate with secure code;
   a first input/output (IO) subsystem that is configured to control input and output functions; and
   a first firewall that is configured such that communication from the first IO subsystem of the device to a range of addresses of the first memory upon boot of the device is blocked until the first firewall has been configured, and further configured to:
   receive a secure-code configuration from the bus master;
   execute the secure-code configuration from the bus master to configure the first firewall subsequent to boot such that the firewall has an effect that non-secure code is prevented from configuring the first firewall; and
   after configuration of the first firewall, selectively allow the first IO subsystem access to the first memory based on the range of addresses of the first memory configured as accessible to the first IO subsystem.

2. The apparatus of claim 1, the device further including:
   a second subsystem;
   a second firewall that is configured to have an effect of blocking communication from the second subsystem upon boot of the device, and further configured to:
   receive another secure-code configuration;
   execute the secure-code configuration from the bus master to configure the second firewall subsequent to boot such that the firewall has an effect that code that is not secure code is prevented from configuring the second firewall; and
   after configuration of the second firewall, upon the second subsystem attempting to access the first memory, selectively allow the second subsystem access to the first memory based on a range of addresses of the first memory configured as accessible to the second subsystem, wherein the at least the portion of the range of addresses of the first memory configured as accessible to the first subsystem in the first firewall does not overlap with the range of addresses of the first memory configured as accessible to the second subsystem in the second firewall.

3. The apparatus of claim 1, wherein the first memory is at least one of a static random-access memory or a flash memory.

4. The apparatus of claim 1, wherein the first firewall is further configured to:
   after configuration of the first firewall, selectively allow the first subsystem access to a second memory based on ranges of addresses of the first memory configured as accessible to the first subsystem in the first firewall.

5. The apparatus of claim 1, wherein the first firewall is further configured to:
   after configuration of the first firewall selectively allow the first subsystem access to the first peripheral based on a set of peripherals configured as accessible to the first subsystem in the first firewall.

6. The apparatus of claim 1, wherein the bus master is further configured to:
   after configuration of the first firewall, set a sticky lock bit for the first firewall, wherein the firewall is further configured to prevent firewall from being reconfigured until reboot after the sticky lock bit for the first firewall is set.

7. A method, comprising:
   using a first firewall such that communication from a first input/output (IO) subsystem of a device to a range of addresses of a first memory is blocked upon boot of the device;
   enabling the first firewall to be configured by secure code subsequent to boot such that non-secure code is prevented from configuring the first firewall until the first firewall has been configured; and
   after configuration of the first firewall, upon the first subsystem attempting to access the first memory, based on the configuration, using the first firewall to selectively allow the first IO subsystem access to the first memory based on the range of addresses of the first memory configured as accessible to the first IO subsystem.

8. The method of claim 7, further comprising:
   using a second firewall such that communication from a second subsystem is blocked upon boot of the device;
   enabling the second firewall to be configured by secure code subsequent to boot such that code that is not secure code is prevented from configuring the second firewall; and
   after configuration of the second firewall, upon the second subsystem attempting to access the first memory, based on the configuration, using the second firewall to selectively allow the second subsystem access to the first memory based ranges of addresses of the first memory configured as accessible to the second subsystem, wherein the at least the portion of the range of addresses of the first memory configured as accessible to the first subsystem in the first firewall does not overlap with the range of addresses of the first memory configured as accessible to the second subsystem in the second firewall.

9. The method of claim 7, wherein the first memory is at least one of a static random-access memory or a flash memory.

10. The method of claim 7, wherein the first firewall is a hardware firewall.

11. The method of claim 7, wherein the first subsystem includes a microcontroller.

12. The method of claim 7, further comprising:
after configuration of the first firewall, upon the first subsystem attempting to access a second memory, using the first firewall to selectively allow the first subsystem access to the second memory based ranges of addresses of the first memory configured as accessible to the first subsystem in the first firewall.

13. The method of claim 7, further comprising:
after configuration of the first firewall, upon the first subsystem attempting to access to a first peripheral, using the first firewall to selectively allow the first subsystem access to the first peripheral based on a set of peripherals configured as accessible to the first subsystem in the first firewall.

14. The method of claim 7, further comprising:
after configuration of the first firewall, setting a sticky lock bit for the first firewall, such that after the sticky lock bit is set for the first firewall, the first firewall is prevented from being reconfigured until reboot.

15. An apparatus, comprising:
a first input/output (IO) subsystem; and
a first hardware firewall that is configured such that communication from the first IO subsystem of the apparatus to a window of a first memory is blocked upon boot until the first hardware firewall has been configured, and wherein the first hardware firewall is functional to:
be configured by secure code such that non-secure code is prevented from configuring the first hardware firewall; and
after configuration of the first hardware firewall, based on the configuration, selectively allowing the first IO subsystem access to the first memory based on the window of the first memory configured as accessible to the first IO subsystem.

16. The apparatus of claim 15, the device further including:
a second hardware firewall that is configured such that communication from the second subsystem is blocked upon boot of the device, and further configured to:
enable the second hardware firewall to be configured by secure code subsequent to boot such that code that is not secure code is prevented from configuring the second hardware firewall; and
after configuration of the second hardware firewall, based on the configuration, selectively allow the second subsystem access to the first memory based on window of the first memory configured as accessible to the second subsystem, wherein the at least the portion of the window of the first memory configured as accessible to the first subsystem in the first hardware firewall does not overlap with the window of the first memory configured as accessible to the second subsystem in the second hardware firewall.

17. The apparatus of claim 15, wherein the first subsystem includes a microcontroller.

18. The apparatus of claim 15, wherein the first hardware firewall is further configured to:
after configuration of the first hardware firewall selectively allow the first subsystem access to a second memory based a window of the first memory configured as accessible to the first subsystem in the first hardware firewall.

19. The apparatus of claim 15, wherein the first hardware firewall is further configured to:
after configuration of the first hardware firewall, selectively allow the first subsystem access to the first peripheral based on a set of peripherals configured as accessible to the first subsystem in the first hardware firewall.

20. The apparatus of claim 15, wherein the first hardware firewall is further configured to:
after configuration of the first hardware firewall, responsive to secure code, set a sticky lock bit for the first hardware firewall, such that after the sticky lock bit is set for the first hardware firewall, the first hardware firewall is prevented from being reconfigured until reboot.

* * * * *